United States Patent [19]

Rast

[11] Patent Number: 4,804,565
[45] Date of Patent: Feb. 14, 1989

[54] PADS FOR ABSORBING PRESSURE SHOCKS AND METHOD OF MANUFACTURE THEREOF

[75] Inventor: Wlodzimierz Rast, Mount Osmond, Australia

[73] Assignee: W. Rast Pty. Ltd., South Australia, Australia

[21] Appl. No.: 885,573

[22] PCT Filed: Oct. 15, 1985

[86] PCT No.: PCT/AU85/00250
§ 371 Date: Jun. 16, 1986
§ 102(e) Date: Jun. 16, 1986

[87] PCT Pub. No.: WO86/02424
PCT Pub. Date: Apr. 24, 1986

[30] Foreign Application Priority Data

Oct. 16, 1984 [AU] Australia ............... PG7662

[51] Int. Cl.4 .................................. B32B 23/02
[52] U.S. Cl. ................................. 428/35.3; 264/572;
425/405.1; 428/64; 428/66; 428/69; 428/76;
428/178; 428/192; 428/194; 428/349; 428/458;
428/483; 428/35.9
[58] Field of Search ............... 428/64, 66, 192, 194,
428/458, 461, 483, 349, 69, 76, 178, 35; 425/405
R; 264/572

[56] References Cited

U.S. PATENT DOCUMENTS 3,442,293  5/1969  Erdmann ............... 138/30
4,117,061  9/1978  Vester ..................... 264/92
4,238,263 12/1980  LoMaglio ............... 156/213
4,424,182  1/1984  Cerny ..................... 264/138
4,497,388  2/1985  Dexter ................... 181/233

FOREIGN PATENT DOCUMENTS 163034  2/1954  Australia .
1440770  6/1976  United Kingdom .

OTHER PUBLICATIONS

WO 84/00797, Mar. 1984, International Application, Rast.
WO 81/00230, Feb. 1981, International Application, McHenry.

Primary Examiner—Marion C. McCamish
Attorney, Agent, or Firm—Bruce L. Adams; Van C. Wilks

[57] ABSTRACT

A gas-filled pad for absorbing shocks and the like, the pad comprising: a pair of heat-sealed laminates defining therebetween a cavity; a pressurized gas sealed within the cavity; and wherein each of the laminates comprises a flexible strengthening member having a pair of opposite major sides and being impervious to the gas, and a pair of thermoplastic films each bonded to one of the opposite sides of the strengthening member, the pair of thermoplastic films extending beyond the outer edge of the strengthening member and being heat-sealed together in the region where the films extend beyond the outer edge of the strengthening member to thereby totally enclose the strengthening member.

15 Claims, 4 Drawing Sheets

PADS FOR ABSORBING PRESSURE SHOCKS AND METHOD OF MANUFACTURE THEREOF

This invention relates to pads for absorbing pressure shocks and a method of manufacturing same and relates in particular though not exclusively to pads and apparatus of the type described in relation to our earlier Letters Patent Application No. W084/00797 having an international publication date of the Mar. 1st, 1984.

Pads of this nature require to be such that they can for instance be connected to a water supply system without in any way forming means which could contaminate the water of the system.

It should be realized that the construction of such pads naturally presents problems because the pressure involved can be high and the pads for instance, in the case where they are used to prevent water hammer, may be subject to long periods of high alternating stresses and must be capable of withstanding such usage.

An object of the present invention is to provide a specific form of pad and pad arrangement which not only supplies durable pads but guards against contamination of the medium in which the pads are used.

A further object is to ensure that the membranes themselves, particularly a metal strength member, are not attacked by the fluid in which the pads operate.

A still further object of the invention is to ensure that the pads are held in a position where they effectively absorb pressure shocks.

A further object is to provide an effective method and machine for manufacturing such pads.

The pads according to this invention comprise a pair of laminates which are peripherally sealed together to contain a gas under pressure, characterized by the laminates each comprising a strength member impervious to gas in the nature of a foil, and on each side of the strength member, bonded thereto, thermoplastic films, further characterized in that the thermoplastic films, extends beyond the edge of the strength member, and the films are sealed together marginally beyond the edge of the strength member, whereby to totally enclose the strength member.

An added film can be bonded between the strength member and the thermoplastic film, and the method of construction of the pad can comprise forming a laminate having thermoplastic films bonded to each side of a foil strength member, placing a first such laminate adjacent to a second such laminate and heat sealing the ribbons together inwards of the periphery of the pad, cutting the pad from the laminates, and subsequently heat sealing the peripheral portions of the thermoplastic films together while allowing the softened thermoplastic films to flow to beyond the periphery of the strength member.

Construction can of course be varied but to enable the invention to be fully appreciated, an embodiment of such a pad and a machine for its manufacture will now be described with reference to the accompanying drawings in which.

Figure 3:
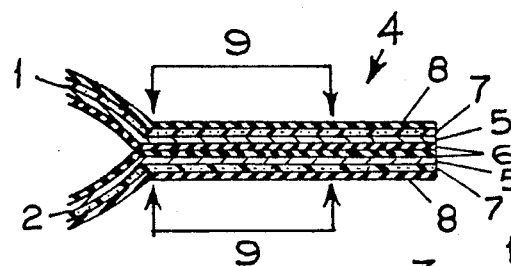
Figure 4:
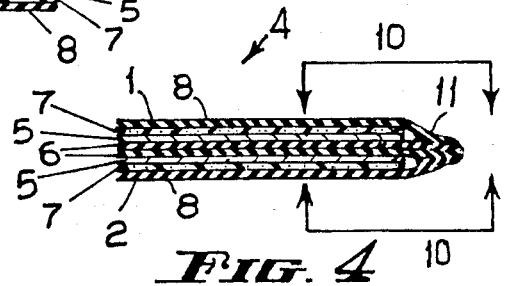
Figure 5:
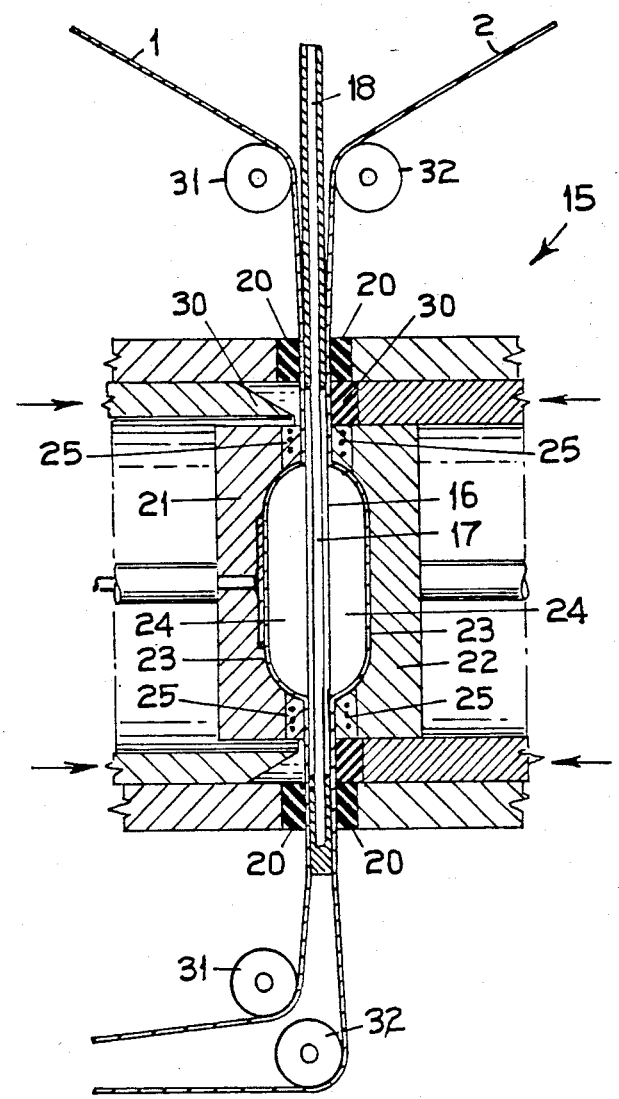
Figure 6:
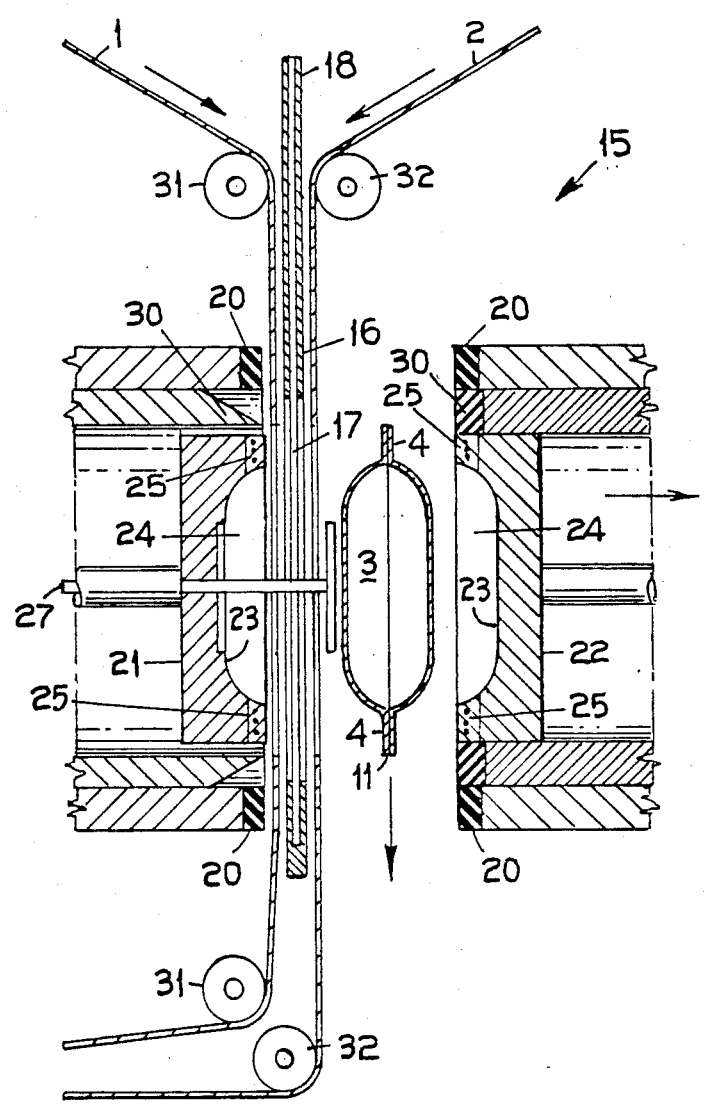
Figure 7:
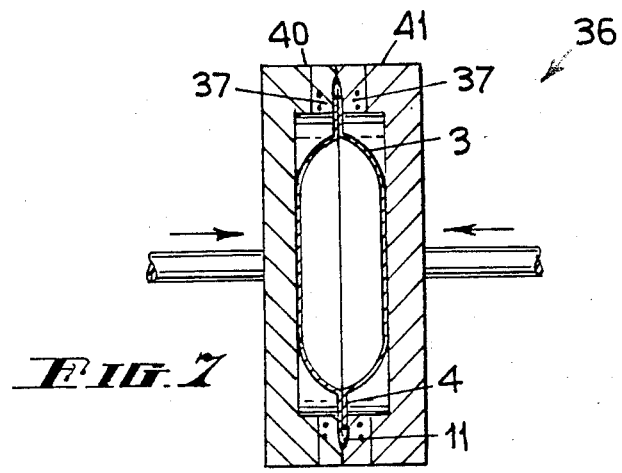
Figure 8:
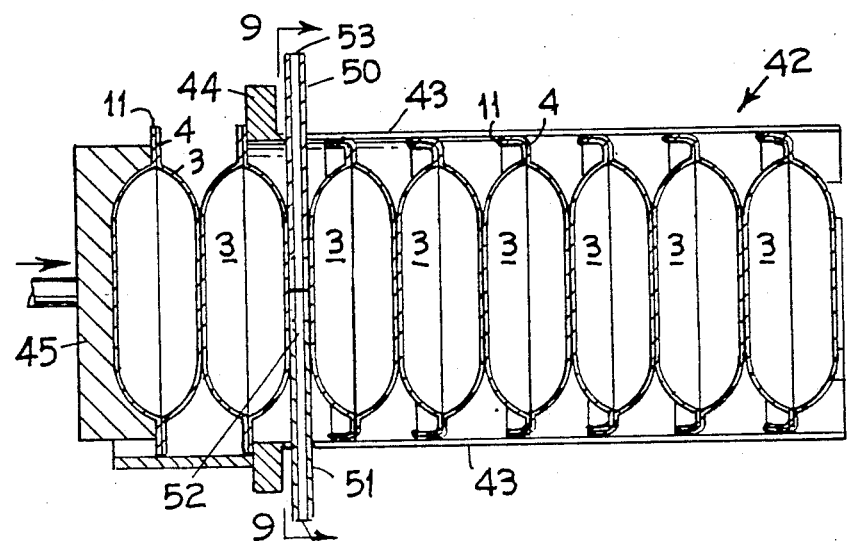
Figure 9:
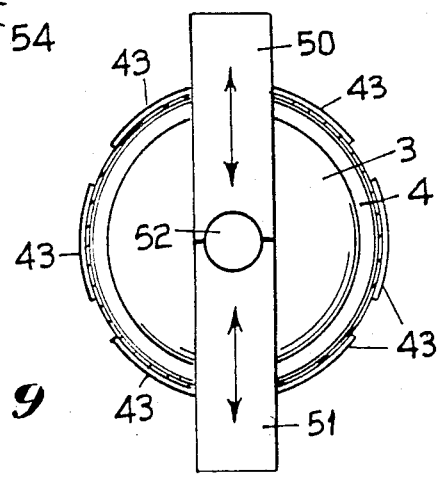

FIG. 3 is an enlarged sectional view showing an edge portion of a pad showing a preferred laminate assembly and showing by arrows how, at a first stage, the various layers are heat sealed together adjacent to the margin of a pad, FIG. 4 is a view similar to FIG. 3 but showing by arrows how the actual marginal portion is heat sealed at a second stage to cause the thermoplastic layer to overflow, the marginal edge of the metallic strength member, FIG. 5 is a transverse section of the pad-forming part of the machine showing how two laminates are brought together and a pad is formed by blowing the laminates into dies and are heat sealed and cut, the seal being that shown in FIG. 3, FIG. 6 shows in similar section how the partly completed pad is discharged, FIG. 7 shows how the pad has its marginal edge sealed as shown in FIG. 4, FIG. 8 places in central section how a series of such pads are joined together in readiness to be compressed into a container, and FIG. 9 is a sectional end elevation of FIG. 8.

Figure 2:
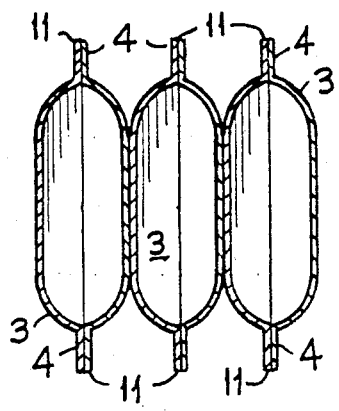
FIG. 2 is a sectional elevation showing a pad assembly.

The laminates 1 and 2 which form the pad 3 as shown in FIGS. 2, 3 and 4 are of circular form sealed together around the perimeter 4 of the laminates so that the two laminates 1 and 2 are held together to form a container in which the gas or air, which is a pressurizing means for the pad, is held, and through which laminates it cannot leak because of the selected material of the laminates.

The laminates may vary but in the form shown in the drawings, see particularly FIGS. 2 and 3, comprise strengthening member in the form, for example, of a metal foil 5 such as aluminum which has the necessary strength and to this is bonded on the inside a protective film 6 of polypropylene or the like, and on the other side a film 7 of polyester to which in turn is bonded a film 8 of polypropylene which forms the outer skin of each pad 3. The films 6, 7 and 8 are thermoplastic to allow the heat flow and edge sealing shown particularly in FIG. 3.

Because of the method of construction, when the pad 3 is completed, the plastic films 6,7 and 8 extend marginally beyond the metal foil 5 and have the marginal edges of the films sealed together to form a sealed outer envelop which isolates the metal foil. The outer film 8 of the protective membrane is selected to be inert in the liquid in which the pad is immersed so that a pad is then formed which has a protective outer skin inert to the water or liquid in which it is submerged. The inner film 6 of each membrane protects the inner side of the metal foil and these films, together with the film 7 serving to assist in sealing in the gas which controls the compression of the pad 3.

Thus the laminates 1 and 2 from which the pads are formed comprise a main strength member 5 of aluminum foil or a similar material which is capable of withstanding the stress to which the pads are subjected, and this strength member 5 has bonded to a first side, which is the inner side when the pad is formed, a thermoplastic film 6 which can conveniently be cast polypropylene which is bonded to the strength member 5 to form an inner lining for the pad 3, and on the opposite side of the strength member 5 is a polyester or similar film 7 which is capable of effectively sealing the laminate to ensure that there can be no gas leakage from the pad, this polyester film in turn having bonded to it on the opposite side to the strength member 5, an outer film 8 of cast polypropylene or other suitable thermoplastic material which is of a nature such as that it is inert in the gas or liquid in which the pad is to be used in that it forms the outer surface of the pad.

The membranes so formed can conveniently be produced by adhering or bonding the various layers together to form a laminated ribbon which has its two sides formed of a thermoplastic material such as cast polypropylene.

The membranes can thus be said to consist of a strength member 5 such as aluminum foil or the like having bonded to it on one side a non-thermoplastic film 7 such as polyester which ensures that with the aluminum or the like the laminate is gas tight and this inner structure then has bonded on each side of it the thermoplastic film 8. The thermoplastic material allows heat sealing, and also allows flow as shown particularly in FIG. 4 so that the strength material 5 can be completely encased, including its marginal edges.

Refering to FIG. 3 which shows the edge sealing, the arrows 9 define the area where the edge portion of each pad 3 is first sealed by the application of heat and pressure.

In FIG. 4 is shown how the edge of the strength members 5 is covered to protect same, the arrows 10 showing the area where heat and pressure are applied to cause the thermoplastic sheets 6 and 8 to flow outward to seal together beyond the edge of the strength member 5 at the area indicated by 11.

The method of forming the pads themselves from the laminates is shown in FIGS. 5 and 6 and consists in passing two of these laminates 1 and 2 together through a forming station 15, the action of which will be clear from the description of the machine which follows.

At a forming station 15 the two laminates 1 and 2 pass one on each side of a hollow pressurizing annulus 16 which is medially disposed in the forming station, and the central aperture 17 of this pressurizing annulus allows the two laminates 1 and 2 to be pressed together at areas where joining is to be effected and allows the pad 3 to be cut from the ribbon laminates after forming, the pressurizing annulus forming an annular nozzle around the central aperture 17 adapted to be connected by the line 18 to the pressurizing gas so that the gas can be forced from the pressurizing annulus 16 to between the two laminates 1 and 2.

The laminates 1 and 2 are guided through the forming station 15 by two pairs of rollers 31 and 32 and the laminates are fed forward intermittently by any suitable timed feed which allows time for the pads 3 to be formed and cut from the laminates 1 and 2.

When it is desired to form a pad, two pairs of annular sealing rings 20, one above and the other below where the pad is to be cut from the laminates, move inwardly towards the pressurizing annulus 16 from each side to press the laminates 1 and 2 onto the wall of the pressurizing annulus 16 and seal the laminates to the pressurizing annulus, and a gas is forced between the two laminates through the line 18 to expand them outwardly against forming dies 21 and 22 which have concave faces 23 to form cavities 24 preferably part-corrugated or shaped to give the required shape to the membranes forming the pad.

When the correct pressure has been reached, the membranes are forced outwardly to press against the forming dies 21 and 22. Annular edge portions 25 of the forming dies 21 and 22, positioned around the outside of the cavities 24, seal the portion 26 inwards of the edge of the pads 3 of the two laminates together. The forming dies 21 and 22 are held at a correct temperature at their edges by any suitable means to cause the laminates to adhere together around the outside of the forming dies but join only on a circular area as indicated in FIG. 3 by the arrows 9, which sealed area does not extend to the marginal edge of the finished pad. When this joining has been completed, cylindrical cutter means 30 surrounding the forming dies 21 and 22 sever the gascharged pad 3 from the ribbon laminates 1 and 2 and the pad is then discharged from the forming station for further processing in an edge sealing station 36. Discharge is by the pusher rod 27 forcing the pad from the cavity 24, after the die 22 and its associated mechanism is retracted as shown particularly in FIG. 6.

The forming dies 21 and 22, as well as the sealing rings 20, and annular cutters 30 are moved into position and retracted by any suitable mechanism which is not described herein as being readily constructed by persons versed in this art.

The edge sealing station 36, shown particularly in FIG. 7, comprises a sealing member where a circular portion 37 inwards from the perimeter of the pad 3 is subject to sufficient heat to cause the thermoplastic films 6 and 8 of the laminates 1 and 2 to melt sufficiently to cause flow outwards radially between heating dies 40 and 41 so that the outer and inner protective laminate films 6 and 8 extends beyond the inner aluminum or similar strength member 5 as shown in FIG. 4 and is then sealed in this position to ensure that the inner members 5 and 7 of each laminate are completely protected at the end by the outwardly projecting rim 11, thus ensuring that the fluids in which the pad is subsequently immersed does not cause deterioration of the aluminum or other strength member 5.

Figure 1:
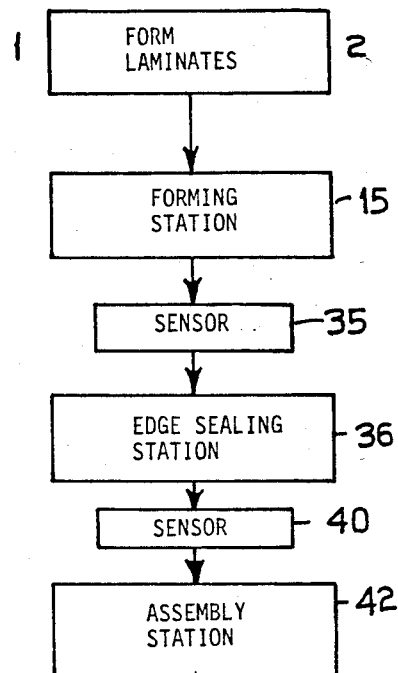
FIG. 1 is a flow diagram showing the method of production.

The pad may move through a testing station 40 (see FIG. 1) after it has been completely sealed, this simply comprising a member which presses against the pad 3 to determine that the correct pressure exists, this not being illustrated as such pressure testing means are within the skill of persons versed in the art.

Such a station 35 could also be included between the forming station 15 and the edge sealing station 36.

By use of this method and the apparatus involved, a pad is formed which is marginally sealed around its edges and consists of a pair of laminates including an inner material of aluminum or the like of sufficient strength to resist damage by the gas pressure within the pad, the pad having the required convexity on each side to allow the pad to be reduced in thickness when pressure is applied to the two sides.

As will be realized this pad is completely encased by the outer membrane of the laminate which can be any suitable thermoplastic material capable of withstanding the environmental conditions of the pad and because of its extension and sealing together beyond the outer edge, that the inner aluminum or other strength material is at all times completely protected against damage by the environment in which the pad is used.

Where such pads are to be used as an array, a further step in the process is to pass these pads into a multiple pad assembly station 42 shown in FIGS. 8 and 9 where the center portions of adjacent pads 3 are joined together by the application of heat, this being achieved at this station 42 by having holding finger means 43 for the pads as they are pushed through an annular forming ring 44 against which each pad 3 is pushed by a punch 45, as the pad reaches this station, the punch 45 pushing each pad 3 through the forming ring 44 which has a diameter somewhat less than the outer diameter of the pads to load the pads into the holding fingers 43 so that the pads are frictionally held by the fingers 43.

Associated with this assembly system are hollow injector blades 50–51 which separate the pad 3 being moved into position by the plunger 45, from pads already held by the fingers 43, these blades 50 and 51 together forming an aperture 52 centrally of the pad 3. The adjacent laminates of two adjacent pads 3 are forced together when the blades 50 and 51 are withdrawn but before this happens the central parts of the two pads are heated by high pressure gas flowing from injector means (not shown) into the aperture 52, through ducts 53 and 54, and the two pads are then pressed together by withdrawal of the blades 50 and 51 to form a permanent junction between the pads at a central area.

In this way any number of pads can be fitted together to form an array of pads in which the pads are axially aligned and will remain in this position during use.

Such compound pad assemblies are then preferably placed into containing means such as described in the earlier referred to patent application and compressed so that the pads are maintained under a substantial pressure but are carefully aligned within the chamber or housing in which they are held and, when such a device is to be used for instance to prevent water hammer, the housing or chamber is simply connected to the source of pressure fluid in which hammer is likely to occur and the pressure fluid is then subject to cushioning by acting on the pads which as stated are pre-compressed to a required value when in the housing or chamber and any shock in the fluid causes compression of the pads to eliminate the action which would otherwise occur and is well known as water hammer.

From the foregoing it will be realized that a highly effective method and apparatus is provided for forming pads suitable for use generally where pressure cushioning is required, such pads maintaining their pressure over long periods withstanding the pressures for which the pads are designed to operate, the pads being inert in the fluid in which they are immersed.

It should be realized that the invention is applicable anywhere where a gas cushion is required and particularly where the cushion must operate in such a manner that no contamination of the environment can take place.

The actual machine for carrying the invention into effect is preferably electrically-pneumatically operated using timing means to carry out the sequence of functions in the various stages, heating means being provided of course at the areas where the thermoplastic material of the membranes has to be softened for joining and these heating means will be water cooled or otherwise arranged to ensure that the correct temperature will be maintained and that rapid heating and cooling can take place and, for instance, in the station where the series of pads are joined at their centers, a pair of hollow blades can be used as described each terminating in an open end of semicircular form so that these members are projected inwards to separate adjacent pads to form the chamber so that hot air can be injected before the blades are retracted to allow the joining to take place when the two thermoplastic membranes are pushed together by the cushioning gas within them.

Timing of the various stages is of course such that the product is not discharged from any station until the next station is ready to receive the partly fabricated pad and this timing can readily be carried out by suitable sensing means such as 35 and 40 which sense the completion of the work at that stage but do not discharge the partly fabricated pad until sensing means at the next station show that it is ready to perform the next function.

The claims defining the invention are as follows:

1. A pad for absorbing pressure shocks comprising: a pair of laminates sealed together to define therebetween a cavity to contain a gas under pressure, each laminate comprising a strength member impervious to gas and being in the nature of a foil, and a thermoplastic film bonded to each side of the strength member, the thermoplastic films extending beyond the edge of the strength member and being heat sealed together marginally beyond the edge of the strength member to thereby totally enclose the strength member.

2. A pad according to claim 1; including another film having different properties than the thermoplastic films bonded between at least one of the thermoplastic films and the strength member.

3. A pad according to claim 1 or 2; wherein the pad is produced by forming a laminate ribbon having thermoplastic films bonded to each side of a foil strength member, placing a first such laminate ribbon adjacent to a second such laminate ribbon and heat sealing the laminates together inwardly of the periphery of the pad, cutting the pad from the laminates and subsequently heat sealing the peripheral portions of the thermoplastic films together while allowing the softened thermoplastic films to flow to beyond the periphery of the foil strength member.

4. A series of pads each as claimed in claim 1 arranged as a stack about a longitudinal axis, each pad being heat sealed to the pad adjacent to it by heat softening the central adjacent portions of contiguous pads and pressing them together to form a bond.

5. A gas-filled pad for absorbing shocks and the like, the pad comprising: a pair of heat-sealed laminates defining therebetween a cavity; a pressurized gas sealed within the cavity; and wherein each of the laminates comprises a flexible strengthening member having a pair of opposite major sides and being impervious to the gas, and a pair of thermoplastic films each bonded to one of the opposite sides of the strengthening member, the pair of thermoplastic films extending beyond the outer edge of the strengthening member and being heat-sealed together in the region where the films extend beyond the outer edge of the strengthening member to thereby totally enclose the strengthening member.

6. A gas-filled pad according to claim 5; wherein each laminate includes another film of different composition than the thermoplastic films and interposed between and bonded to the strengthening member and at least one of the thermoplastic films.

7. A gas-filled pad according to claim 6; wherein the another film has a lesser outward extent than the thermoplastic films and has its outer edge totally enclosed by the heat-sealed thermoplastic films.

8. A gas-filled pad according to claim 6; wherein the another film comprises a polyester film.

9. A gas-filled pad according to claim 5; wherein the strengthening member comprises a metal foil.

10. A machine for forming pads adapted to absorb pressure shocks, which pads comprise a pair of laminates joined together to define therebetween a gas filled cavity, each laminate comprising a strength member having bonded to it on each side a thermoplastic film, the machine comprising: a first forming station having (a) means defining a hollow pressurizing annulus and means to apply gas under pressure thereto;

(b) guide means operative to feed a pair of ribbon laminates one over the one side of the annulus and the other over the other side of the annulus;

(c) sealing rings movable to seal the laminates to the annulus;

(d) a pair of forming dies operative to be heated and having cavities arranged to have marginal portions engage and press together the laminates within the annulus while maintaining gas pressure therebetween to force the laminates into the cavities to form a pad;

(e) annular cutter means between the forming dies and the sealing rings an operative to sever the pad marginally from the laminate ribbons but outwards from the forming dies after pressurizing and sealing the pad; and (f) an edge sealing station operative to receive the pressurized pad and comprising a pair of dies operative to engage unsealed edge portions of the pad to form further heat sealing means of the pad at and beyond the outer edge of the strength member.

11. A machine for forming pads according to claim 10; including means mounting the pair of forming dies for movement toward and away one from the other, said dies each having a cavity to define the pad and each having a marginal heating section to join the pair of ribbon laminates, annular cutter means around said dies and movable to sever the pad from the ribbon laminates, and annular sealing rings surrounding said cutter means, and wherein the pressurizing annulus has a central aperture of a dimension to allow the laminates to be pressed on to the annulus around the aperture but to allow the cutter means to operate through the aperture.

12. A machine for forming pads according to claim 10 or 11; including an assembly station operative to arrange a stack of pads about a longitudinal axis comprising:

(a) a forming ring configured to receive the pads, (b) means extending from one side of the ring to engage and slideably hold a stack of pads, (c) a punch operative to move pads through the forming ring and the extending means, and (d) a pair of hollow injector plates operative to be oppositely inserted in a plane between adjacent pads arranged to inject a hot gas to an aperture formed between the injector plates so as to soften the adjacent thermoplastic films of the pads to bond them together when the hollow injector plates are withdrawn.

13. A method of forming pads which comprise a pair of ribbons laminates having outer thermoplastic films bonded over at least a non-thermoplastic strength member and optionally a further gas impervious film bonded to the strength member, said laminates being heat sealed together to form therebetween a gas filled cavity, the method comprising the steps of:

(a) holding the laminates one on each side of a pressurizing annulus having an aperture around which the holding is effected, (b) injecting a pressurizing gas between the laminates through the aperture, (c) heat sealing the laminates together at an annular area thereof inwards from the edge of the aperture to contain the gas to thereby form a sealed pad, (d) cutting the sealed pad containing the gas from the ribbon laminates outside of the annular heat sealed area, and (e) applying heat and pressure to the marginal edges of the pad to cause the marginal edge portions of the outer thermoplastic films to flow beyond the edge of the non-thermoplastic strength member to seal over the marginal edge of the strength member to thereby seal the strength member against damage by a fluid into which the pad is subsequently placed during use of the pad.

14. The method of claim 13; further comprising the steps of:

(a) assembling a series of the pads in an axial alignment by placing a pair of pads together but with a pair of blades which are movable in a plane normal to the axis of the pads, inserted therebetween, said blades having hollows and having an aperture at inner contiguous ends when inwardly moved to situate said aperture between the pads at a central part, (b) blowing heated gas into the aperture to soften said thermoplastic films, (c) withdrawing the blades outwards from the pads and, (d) pressing the pads together to cause the pads to be joined together at the softened area.

15. The method of claim 14; further comprising the steps of: forcing a series of pads successively through a forming ring by a punch to pass each pad successively against the blades when inwardly projected, and applying the heated gas between that pad and a pad previously moved past the plane of the blades, the pads being held by fingers engaging the marginal edges of the pads during the formation of the series of joined pads.

* * * * *